United States Patent
Kamakura et al.

(10) Patent No.: US 6,839,061 B1
(45) Date of Patent: Jan. 4, 2005

(54) IMAGE DISPLAY SYSTEM AND INFORMATION STORAGE MEDIUM

(75) Inventors: Hiroshi Kamakura, Okaya (JP); Fumio Nagasaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/743,861

(22) PCT Filed: May 1, 2000

(86) PCT No.: PCT/JP00/02900

§ 371 (c)(1),
(2), (4) Date: Mar. 16, 2001

(87) PCT Pub. No.: WO00/72298

PCT Pub. Date: Nov. 30, 2000

(30) Foreign Application Priority Data

May 20, 1999 (JP) .......................................... 11-140453

(51) Int. Cl.$^7$ ................................................ G06F 13/14
(52) U.S. Cl. ........................ 345/520; 345/1.1; 345/903; 345/733
(58) Field of Search .......................... 345/520, 1.1, 1.2, 345/1.3, 3.1, 717, 903, 733, 4, 778; 709/1, 201; 718/1, 105, 106

(56) References Cited

U.S. PATENT DOCUMENTS

| | | | |
|---|---|---|---|
| 5,265,218 A | 11/1993 | Testa et al. .................. | 395/325 |
| 5,523,769 A | 6/1996 | Lauer et al. | |
| 5,946,487 A | 8/1999 | Dangelo ..................... | 395/705 |
| 6,003,065 A | * 12/1999 | Yan et al. | |
| 6,323,854 B1 | * 11/2001 | Knox et al. .................. | 345/418 |

FOREIGN PATENT DOCUMENTS

| | | |
|---|---|---|
| EP | 0 878 759 A1 | 11/1998 |
| JP | A-6-4498 | 1/1994 |
| JP | 7-98645 | 4/1995 |
| JP | 9-154077 | 6/1997 |
| JP | 10-301874 | 11/1998 |
| KR | A 1998-0004099 | 3/1998 |

\* cited by examiner

*Primary Examiner*—Matthew C. Bella
*Assistant Examiner*—Hau Nguyen
(74) *Attorney, Agent, or Firm*—Oliff & Berridge, PLC

(57) ABSTRACT

An image display system transmits and receives supplied data which can be converted by a virtual machine among plural processing devices which are connected via a transmission line, and creates and displays an image. At least two processing devices among the plural processing devices each includes an image display device. At least one of the image display devices includes a conversion device, in which a virtual machine is provided, that converts the supplied data into a data format in which an image can be displayed, a communication interface section that receives the supplied data from another processing device, and a storage device in which created images are stored and which can be accessed from another processing device via the communication interface section. Each of the at least one of the image display device and the other image display device reads some of the images from the storage device and display the images in a shared manner, the other image display device having the conversion device and the communication interface section.

16 Claims, 11 Drawing Sheets

(A)

(B)

IMAGE DISPLAY SYSTEM AND INFORMATION STORAGE MEDIUM

The present invention relates to an image display system and an information storage medium for displaying images.

DESCRIPTION OF THE RELATED ART

Conventionally, programming must be performed in consideration of the environment in which application software is to be used from the software-development stage of the application software.

In particular, in an image display system in a distributed environment, it is necessary for software design to take into consideration which apparatus draws which drawing area, which is a factor which increases the number of development steps.

Also, for example, in a case where images are displayed in real time using plural image display devices, it is necessary for each image display device to display an appropriate image with no image display delay, etc.

However, in order to realize a real-time image display, advanced hardware is necessary, and the necessary amount of storage area becomes large to deal with various functions.

SUMMARY OF THE INVENTION

The present invention has been achieved in view of the above-described problems. A first object of the present invention is to provide an information storage medium and an image display system capable of displaying images while smoothly performing distributed processing.

A second object of the present invention is to provide an information storage medium and an image display system capable of expanding functions dynamically in a case where images are displayed in real time by using plural image display devices.

In order to achieve the above-described objects, in accordance with the present invention, there is provided an image display system which transmits and receives supplied data which can be converted by a virtual machine and which creates and displays an image among plural processing devices which are connected via a transmission line, at least two processing devices among the plural processing devices, each of the at least two processing devices including an image display device, and at least one image display device including:

a converter, in which a virtual machine is provided, that converts the supplied data into a data format in which an image can be displayed;

a communication interface section that receives the supplied data from another processing device; and a storage medium in which created images are stored and which can be accessed from another processing device via the communication interface section, the at least one image display device and another image display device including the converter and the communication interface section each reading some of the images from the storage medium and display them in a shared manner.

According to the present invention, as a result of sharing a storage area, images can be displayed in a shared manner by plural image display devices. This makes it possible to reduce a load in each image display device and to make high-speed image display possible.

Furthermore, as a result of sharing the same storage area, even when different drawing areas are drawn, drawing can be performed while confirming which apparatus is drawing which drawing area, which is effective, in particular, in distributed processing.

Herein, the transmission line is preferably a high-speed transmission line. As a result of using a high-speed transmission line, it is possible for each processing device to access a storage area of another processing device as if access to a storage area of the unit itself were being made.

For such a transmission line, for example, an IEEE 1394 bus, a fibre channel, etc., may be used.

Furthermore, use of a virtual machine makes it easy to exchange data among processing devices. Here, a "virtual machine" is any device which reads a common file format and which can perform an operation specified thereby, and specifically, for example, a JAVA virtual machine, can be used. JAVA is a trademark of Sun Microsystems, Inc., of the USA.

In accordance with the present invention, there is provided another image display system which transmits and receives supplied data which can be converted by a virtual machine and which creates and displays an image among plural processing devices which are connected via a transmission line, at least two processing devices among the plural processing devices, each of the at least two processing devices including an image creation device, and at least one image creation device including:

a converter, in which a virtual machine is provided, that converts the supplied data into a data format in which an image can be created;

a communication interface section that receives the supplied data from another processing device; and a storage medium in which created images are stored and which can be accessed from another processing device via the communication interface section, the at least one image creation device and another image creation device including the converter and the communication interface section each access the storage medium and create images in a shared manner.

According to the present invention, as a result of sharing a storage area, image processing can be performed in a shared manner by plural image creation devices. This makes it possible to reduce a load in each image creation device and to make high-speed image creation possible.

For example, image creation with heavy processing is performed by an image creation device having high processing performance, and image creation with light processing is performed by an image creation device having low processing performance, making it possible to distribute image processing loads.

Furthermore, as a result of sharing the same storage area, even when images of different drawing areas are created, the images can be created while confirming which apparatus is in charge which drawing area, which is effective, in particular, in distributed processing.

Here, the transmission line is preferably a high-speed transmission line. As a result of using a high-speed transmission line, it is possible for each processing device to access a storage area of another processing device as if access to a storage area of the unit itself were being made.

For such a transmission line, for example, an IEEE 1394 bus, a fibre channel, etc., may be used.

Furthermore, use of a virtual machine makes it easy to exchange data among processing devices. Here, a "virtual machine" is any device which reads a common file format and which can perform an operation specified thereby, and specifically, for example, a JAVA virtual machine, can be used.

In accordance with the present invention, there is provided another image display system which transmits and receives supplied data which can be converted by a virtual machine and which creates and displays an image among plural processing devices which are connected via a transmission line, at least one processing device among the plural processing devices including an image creation device, at least one processing device among the plural processing devices including an image display device, the image display device including:

a converter, in which a virtual machine is provided, that converts the supplied data into a data format in which an image can be displayed; and a communication interface section that receives the supplied data from another processing device, the image creation device including:

a supplied data creating device that creates supplied data which can be converted by the converter on the basis of a created image; and a communication interface section that transmits supplied data containing the created image to the image display device via the transmission line, at least one of the image creation device and the image display device including a storage medium in which created images are stored and which can be accessed from another processing device via the communication interface section, and the image creation device and the image display device each access the storage medium, and create and display images.

According to the present invention, as a result of sharing a storage area, image processing can be performed by plural image creation devices and plural image display devices in a shared manner. This makes it possible to reduce the load on each processing device and to make high-speed image display possible.

Here, the transmission line is preferably a high-speed transmission line. As a result of using a high-speed transmission line, it is possible for each processing device to access a storage area of another processing device as if access to a storage area of the unit itself were being made.

For such a transmission line, for example, an IEEE 1394 bus, a fibre channel, etc., may be used.

Furthermore, use of a virtual machine makes it easy to exchange data among processing devices. Here, a "virtual machine" is any device which reads a common file format and which can perform an operation specified thereby, and specifically, for example, a JAVA virtual machine, can be used.

Also, preferably, the supplied data contains a part object which makes up a part of a program for image processing, and the converter creates a program for creating the display data on the basis of the received part object.

According to this, the image display device receiving the part object can quickly create display data which reflects the part object.

More specifically, as a result of distributing the part object, it is possible to realize an image display system capable of changing specifications, expanding functions, etc., dynamically and easily.

Herein, as the part objects, for example, JAVA applets, etc., can be used.

Also, preferably, the supplied data contains at least one of image data and control data for controlling a display of the image, and the image display device includes:

a display device that displays the image on the basis of the image data; and a display controller that controls a display of the image on the basis of the control data.

According to this, it is possible to realize an image display system capable of exchanging various data among processing devices. For example, a process, such as underlining some characters to be displayed by using control data, becomes possible.

Also, the supplied data contains at least one of the original data of an image to be created and control data for controlling a creation of the image, and the image creation device includes:

an image creating device that creates the image on the basis of the original data; and a controller that controls the creation of the image on the basis of the control data.

According to this, it is possible to realize an image display system capable of exchanging various data among processing devices. For example, a process, such as highlighting some characters to be displayed by using control data, becomes possible.

Also, preferably, the transmission line is an IEEE 1394 bus, and the communication interface section is an IEEE 1394 bus interface.

According to this, the IEEE 1394 bus is a high-speed by using, and it is possible to quickly exchange data among processing devices. As a result, for example, it is possible to easily share a storage area.

Also, as a result of using an IEEE 1394 bus interface, a communication method can be standardized. For example, it is possible to enhance the reliability of transmission and reception of data by standardizing the communication protocol to SBP2 (Serial Bus Protocol-2), etc.

Also, preferably, the plural image display devices are interconnected via the transmission line, and each image display device displays a different display area in a shared manner.

According to this, as a result of displaying different display areas in a shared manner by plural image display devices, the load of each image display device is reduced, thereby enabling a high-speed display.

Also, as a result of sharing a storage area, it is possible for each image display device to determine the drawing area of another image display device, and even different drawing areas may be shared appropriately and be displayed.

Here, image display devices correspond to, for example, in addition to projectors, display devices, such as CRTs (Cathode Ray Tube), PDPs (Plasma Display Panel), FEDs (Field Emission Display), ELs (Electroluminescent Display), and direct-view-type liquid-crystal display devices.

Also, preferably, the plural image display devices are interconnected via the transmission line, and each image display device displays images in an overlapping manner with respect to the same display area.

As a method of displaying images in an overlapping manner in this way, for example, it is possible to use a display method in which there is a relationship of in front of and behind, such as foreground and background, a three-dimensional display form by superposing an image for the left eye and an image for the right eye, a display method using a varifocal mirror method of showing a three-dimensional image by causing an image to be reflected by a vibrating mirror, etc.

According to this, also when such a display method is to be realized, by distributing loads, it is possible to produce a display quickly and appropriately.

Also, preferably, at least one of the image creation device and the image display device includes a projector.

According to this, it is possible to realize a projector having versatility and high-function expandability, which realizes the above-described functions. It is also possible to realize a projector having the image creation device and the image display device.

Also, in accordance with the present invention, there is provided an information storage medium in which information for creating and displaying an image while distributed processing is being performed is stored by transmitting and receiving supplied data in a common format which can be interpreted by a virtual machine among plural processing devices connected via a transmission line, and which can be read by a computer having a storage medium, the information containing information for implementing a communication interface section that stores the storage medium with another processing device.

According to the present invention, it is possible to provide a storage medium which can be accessed from each processing device. Realization of such a storing method is effective, in particular, in distributed processing.

Also, as a result of using a virtual machine and standardizing supplied data to a common format, it is possible for each processing device to perform communication without needing to know the communicating party, which is effective, in particular, in distributed processing.

Here, preferably, the transmission line is an IEEE 1394 bus, and the communication interface section is an IEEE 1394 bus interface.

According to this, it is possible for each processing device to access the shared storage medium as if access to a storage area of the unit itself were being made.

In accordance with another aspect of the present invention, there is provided an information storage medium in which information for creating and displaying an image while distributed processing is being performed is stored by transmitting and receiving supplied data in a common format which can be interpreted by a virtual machine among plural processing devices connected via a transmission line, and which can be read by a computer, the information containing:

information for creating supplied data in the common format; and information for transmitting the created supplied data to at least one of the processing devices having a storage medium which can be accessed by each processing device.

According to the present invention, as a result of creating supplied data in a common format and storing it in a storage medium in a shared form, it is possible for each processing device to access the storage medium in order to obtain supplied data, which is effective, in particular, in distributed processing.

For example, when JAVA applets are used as supplied data, JAVA applets stored in the storage medium can be downloaded by plural processing devices at the same time, and specification change, function expansion, etc., can be performed easily.

According to this, it is possible for each processing device to access the shared storage medium at high speed as if access to a storage area of the unit itself were being made.

Also, in accordance with the present invention, there is provided another information storage medium in which information for creating and displaying an image while distributed processing is being performed is stored by transmitting and receiving supplied data in a common format which can be interpreted by a virtual machine among plural processing devices connected via a transmission line, and which can be read by a computer, the information containing:

reading information for reading the image data stored in the storage medium, with respect to at least one processing device including a storage medium which can be accessed by each processing device and in which image data is stored; and display information for displaying the read image data, the reading information containing:

information for creating supplied data indicating a reading request and for converting it into supplied data in the common format; and information for transmitting the converted supplied data to a processing device having the storage medium, and for receiving supplied data containing image data from the processing device, and the display information containing:

information for implementing the virtual machine; and information for converting supplied data by using the virtual machine on the basis of received supplied data and for displaying an image.

According to the present invention, as a result of using supplied data in a common format, it is possible to receive and display image data without depending on the type of apparatus on an image provision side by overcoming differences in operating systems and makers.

In accordance with the present invention, there is provided another information storage medium in which information for creating and displaying an image while distributed processing is being performed is stored by transmitting and receiving supplied data in a common format which can be interpreted by a virtual machine among plural processing devices connected via a transmission line, and which can be read by a computer, the information containing request information for requesting a predetermined service to another processing device; and provision information for providing a predetermined service to another processing device, and the request information containing information for creating supplied data indicating a request for the predetermined service and for converting it into supplied data in the command format; and information for transmitting the converted supplied data to another processing device, and the provision information containing information for implementing the virtual machine;

information for receiving a service request from another processing device and for converting it by using the virtual machine;

information for determining whether or not the service can be provided on the basis of the converted supplied data; and information for providing the service when the service can be provided.

According to the present invention, it is possible for each processing device to perform image processing in a shared manner while exchanging information with one another. For example, if a printing service is requested from the projector, a printer capable of providing a printing service responds to this and performs printing.

Such distributed processing can be realized by using a virtual machine and by making exchange of data among processing devices easy by standardizing supplied data to a common format.

Also, preferably, the supplied data contains at least one of image data, an object for creating an image, an object for controlling image creation, an object for displaying an image, and an object for controlling image display.

According to this, since these data and objects are standardized to a common format, it is possible to increase versatility of various types of image processing in distributed processing.

Also, preferably, the transmission line comprises an IEEE 1394 bus.

According to this, it is possible for each processing device to access the above-mentioned shared storage medium at high speed as if access to a storage area of the unit itself were being made. Also, it is possible for each processing device to perform the above-described information exchange at high speed, thereby increasing the processing speed.

BRIEF DESCRIPTION OF THE DRAWINGS

FIGS. 1(A) and 1(B) include diagrams showing image display in a case where image display is produced in a subdivided manner, wherein FIG. 1(A) is a diagram showing a case in which only one liquid-crystal projector is used, and FIG. 1(B) is a diagram showing an example of image display by using four liquid-crystal projectors.

FIGS. 3(A) and 3(B) include diagrams showing a communication method in a case where a virtual machine is used, wherein FIG. 3(A) is a diagram showing a conventional communication method, and FIG. 3(B) is a diagram showing a communication method according to this embodiment.

DETAILED DESCRIPTION OF THE PREFERRED EMBODIMENTS

Generally, programming must be performed in consideration of the environment in which application software is to be used from the software-development stage of the application program.

More specifically, it is necessary to perform programming while taking into consideration about the type of apparatus and the type of operating systems, with which the program will be used.

Supplied data which is transmitted and received by an image display system is processing-intensive (heavy) data, such as moving images, and in an image display system used for meetings, etc., there are cases in which a meeting lasts for many hours, and a large amount of data is transmitted and received.

In order to handle such processing-intensive data and a large amount of data, a high-speed transmission line, and distributed processing in which processing loads are distributed among apparatuses, are required.

Examples of an image display system which requires the distributed processing include an image display system using plural projectors, an image display system using a multi-display method, an image display system for displaying a stereoscopic object by a varifocal mirror method, etc.

In the following, in this embodiment, first, a description is given by taking as an example an image display system used in a presentation site, the image display system using a liquid-crystal projector. Then, a description is given by taking as an example an image display system using a plurality of image display terminals.

(Example of image display system using liquid-crystal projector)

Figure 1:
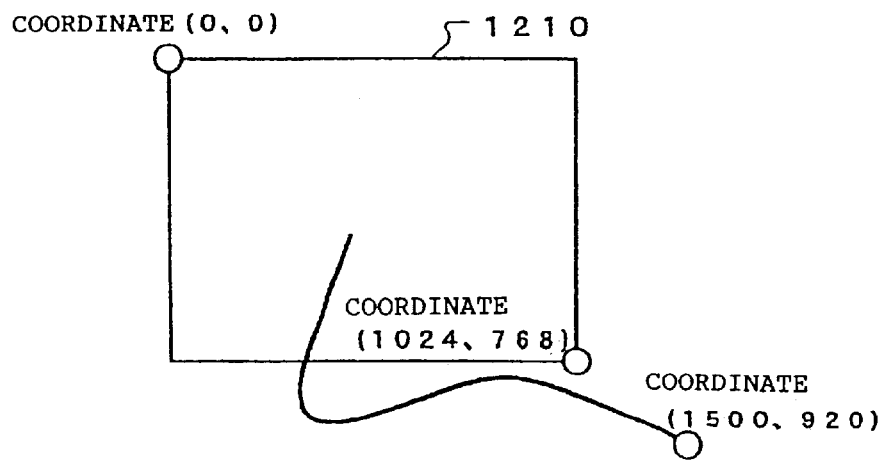
Figure 1:
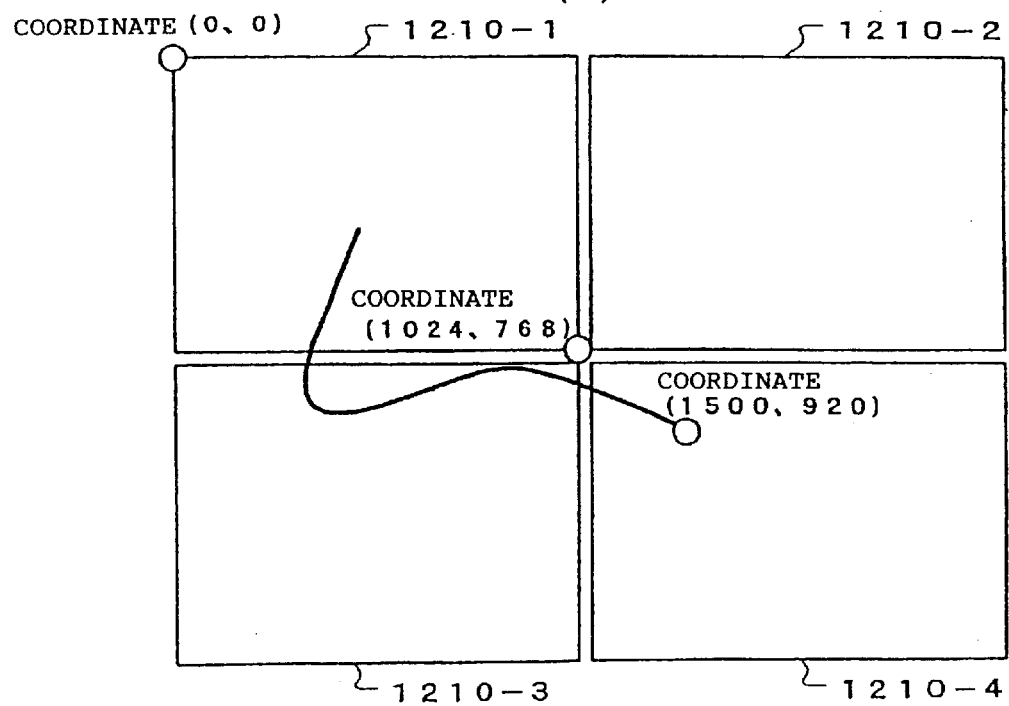

FIGS. 1(A) and 1(B) include diagrams showing image display in a case where image display is performed in a distributed manner, wherein FIG. 1(A) is a diagram showing a case in which only one liquid-crystal projector is used, and FIG. 1(B) is a diagram showing an example of image display using four liquid-crystal projectors.

In the case where image display is performed by one liquid-crystal projector, in a PC which supplies image data to the liquid-crystal projector, UXGA display, i.e., a display of 1600×1200 pixels, is possible. However, in a state in which the liquid-crystal projector supports an XGA display, that is, only up to a display of 1024×768 pixels is supported by the projector, there is a case in which the pointer indicates a coordinate (1500, 920) at which display cannot be performed by a liquid-crystal projector 200 in accordance with the instruction by the person giving the presentation although the coordinate can be displayed by the PC.

In such a case, as shown in FIG. 1(A), in practice, it is impossible for the liquid-crystal projector to produce the display. For this reason, since the pointer does not move as operated by the person giving the presentation, a situation may occur in which an effective presentation cannot be given.

To avoid such a situation, as shown in FIG. 1(B), by using four liquid-crystal projectors, four images 1210-1 to 1210-4 may be projected in a shared manner so that the display area whose display is supported by a PC can be supported.

Figure 2:
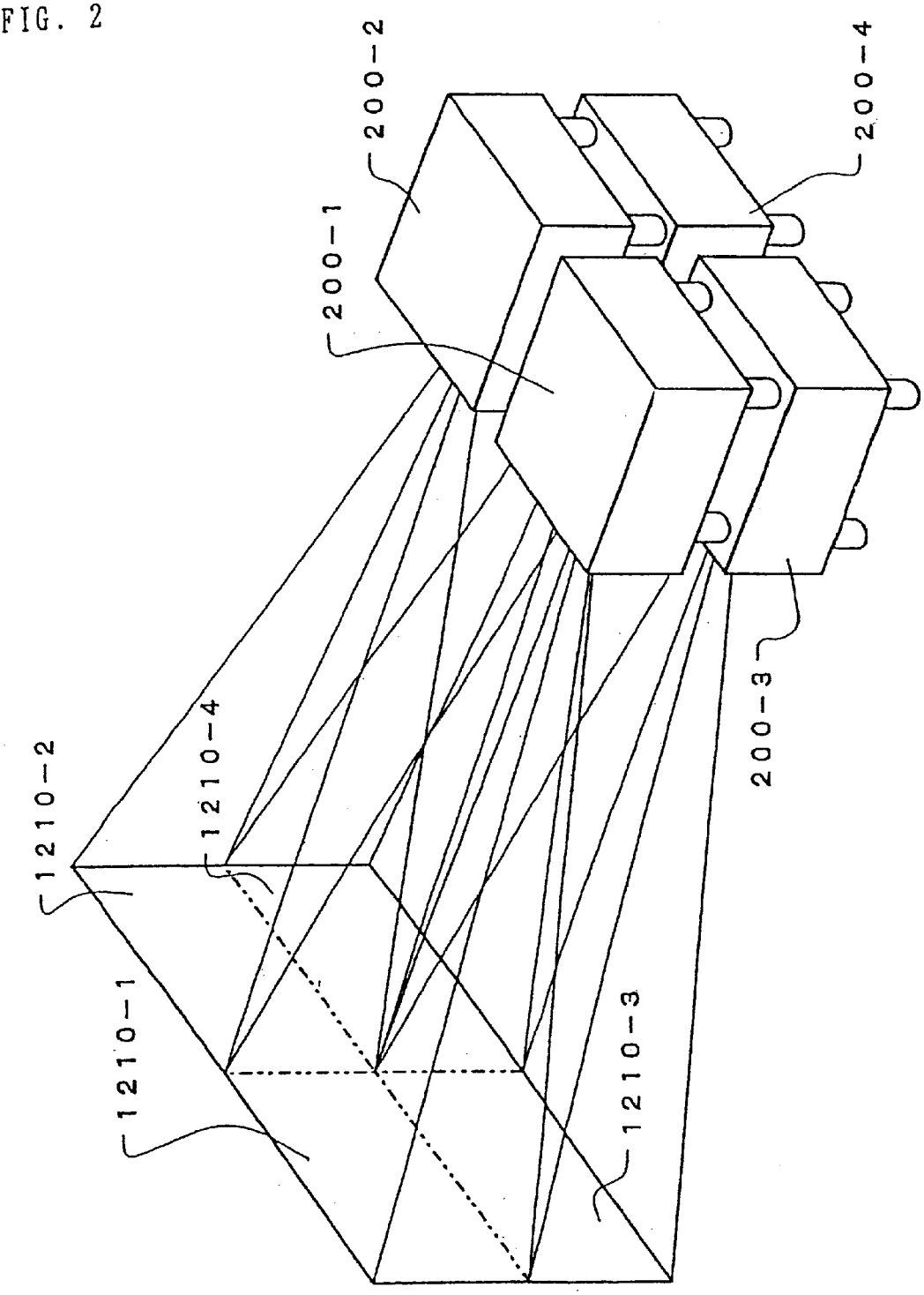
FIG. 2 is a schematic view in a case where image display is produced in a subdivided manner using four liquid-crystal projectors.

FIG. 2 is a schematic view in a case where image display is produced in a distributed manner by using four liquid-crystal projectors 200-1 to 200-4.

Basically, in the case where one image is displayed in a shared manner, it is necessary to determine in advance which apparatus should be in charge of which range. Dividing a particular image spatially and displaying the images by using four liquid-crystal projectors are typical parallel processes. At a stage in which image data is created by using application software for a processing device for creating image data, when parallel syntax suitable for such a parallel process are described in advance, this is convenient from a processing point of view. Japanese Patent Application Publication No. 6-4498 discloses a method of writing parallel execution units contained in "cobegin and coend" and translating them, and this method may also be applied to this embodiment.

Figure 3:
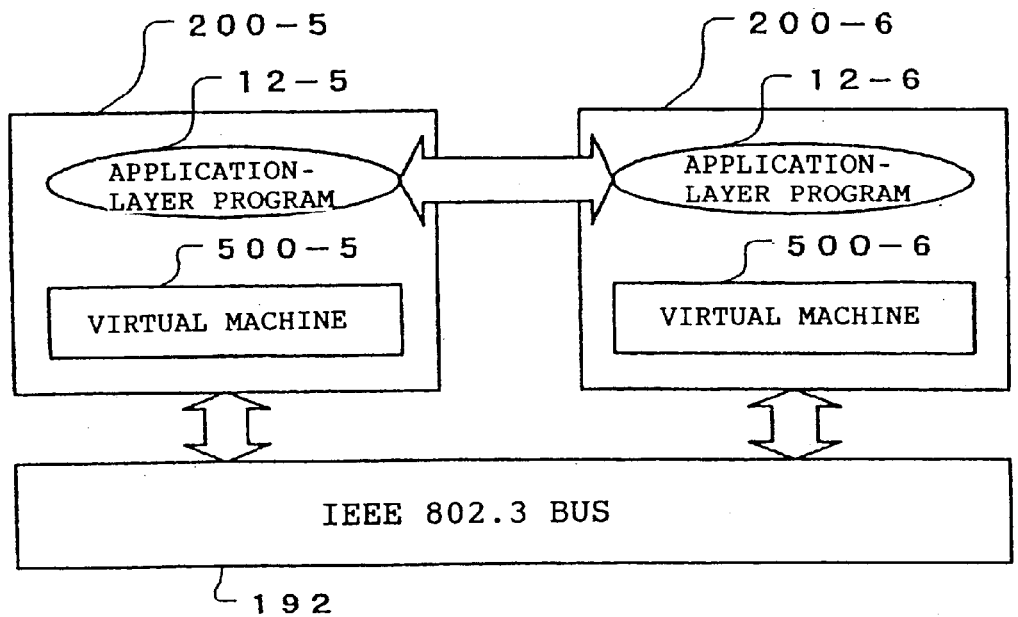
Figure 3:
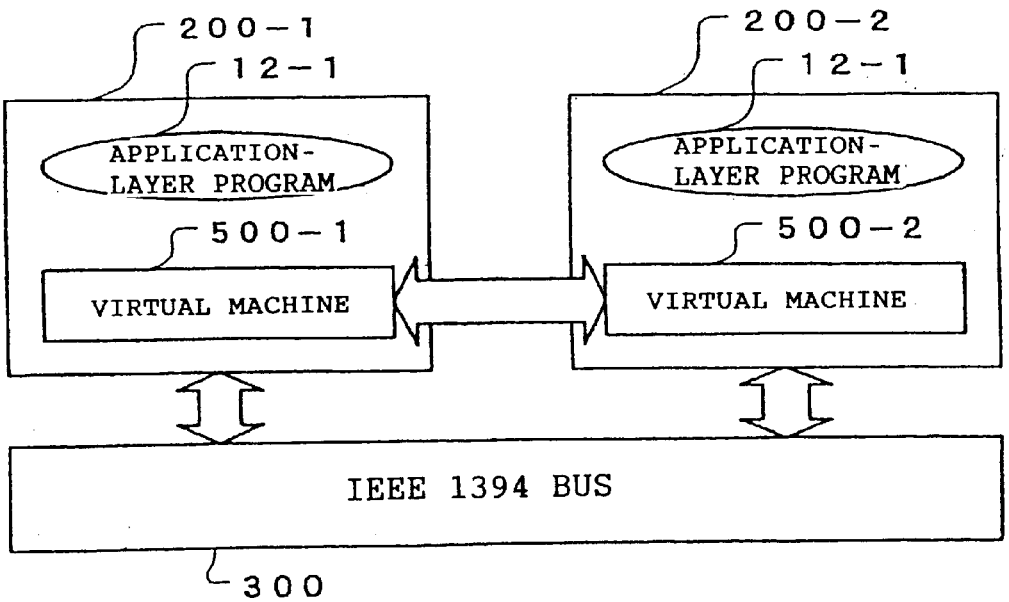

FIGS. 3(A) and 3(B) include schematic diagrams showing a communication method in the case where a virtual machine 500 is used, wherein FIG. 3(A) is a diagram showing a conventional communication method, and FIG. 3(B) is a diagram showing a communication method according to this embodiment.

In the case where the virtual machine 500 is merely provided in the liquid-crystal projector 200 in order to perform dynamic distributed processing, it is necessary to create application software, that is, an application-layer program 12, by fully considering as to which liquid-crystal projector 200 should be in charge of which drawing area at the stage in which the application-layer program 12 is created.

Generally, in order that particular execution units in a program be processed in parallel, the following two conditions must be satisfied. First, it is necessary for the processing system for a target program, including the OS, to have certain program blocks, in other words, resources capable of executing execution units in parallel, and more specifically, to have an independent processor unit corresponding to the number of parallelizations. Second, it is necessary that the target program itself have processing units which can be executed in parallel and that the program be described in such a manner that the processing units can be determined by the processing system.

In this embodiment, "distributed execution" is a broad concept of parallel execution. Among cases in which a particular processing unit to be processed is distributed to another processing system and is executed thereby, a special case in which processing is preferably performed in parallel in terms of time and the results must be synchronized at a particular time is called "parallel execution".

For example, as shown in FIG. 3(A), in the case where two liquid-crystal projectors 200-5 and 200-6 are connected to each other by an IEEE 802.3 bus 192, from an image point of view, a connection is established so that application-layer programs 12-5 and 12-6 recognize each other. When a portion exceeding the display range of the liquid-crystal projector 200-5 itself is detected, the liquid-crystal projector 200-5 which starts interpreting image data first tries to perform distributed processing on that portion together with the liquid-crystal projector 200-6.

At this time, as a specific operation, a control section which has read a transmission control program of an installed OS of the liquid-crystal projector 200 opens a connection line to the liquid-crystal projector 200-6 through the IEEE 802.3 bus 192, and transmits a target range of distributed processing.

It is necessary for the application-layer program 12-5 to perform processing in sequence, such as connection of a network, opening of a line, and transmission of processing portions, by using a service routine of the installed OS. For the other application-layer program 12-6, it is necessary to perform processing on the server side, such as connection of a network in a similar manner, permission to open a line, and reception of processing portions.

If so much processing is required in order to use plural liquid-crystal projectors, the specifications of the application-layer programs 12-5 and 12-6 become complex, making it necessary to write a program for a specific purpose in accordance with the execution environment each time.

The "application-layer program 12" is actually source presentation data, which is created by another application-layer program, for creating presentation materials.

Also, the content of the source presentation data is a set of instruction words of intermediate-language objects, executed by the virtual machine 500.

In order to facilitate use, it is necessary that the application-layer program be described by interspersing a plurality of parallel syntax therein on the premise of parallel processing of a certain degree from the beginning. Also, it is necessary that its design be made so that parallel execution can be performed when the execution environment permits parallel processing. Instead, the virtual machine 500 may communicate with another virtual machine dynamically and independently so as to distribute loads.

As a technique for describing a plurality of parallel processing syntax in advance of the former case, a communication method among intermediate-language interpreters, disclosed in Japanese Patent Application Publication No. 6-4498 by the present applicant, may be implemented.

Also, as a method of communicating with another virtual machine dynamically and independently at the execution stage of the latter case, for example, a technique realized by using a JAVA virtual machine, a technique by multiple agents, etc., may be used. JAVA is a trademark of Sun Microsystems, Inc., of the USA.

As a result of using such techniques, even when the number of liquid-crystal projectors is increased to 16, 64, etc., it is not necessary to create source presentation data again.

In this embodiment, as shown in FIG. 3(B), an IEEE 1394 bus 300 which realizes remote access of memory resources among nodes is used.

In the case of a method of implementing a communication method among intermediate-language interpreters, disclosed in Japanese Patent Application Publication No. 6-4498 by the present applicant, at the loading stage, an interpreter on the master side of a virtual machine 500-1 of a certain liquid-crystal projector 200-1 reads object code described in an intermediate language, which is a process to be executed in a memory space of another liquid-crystal projector 200-2, into a work area of an interpreter on the slave side, then, stack initialization data is read in, initialized data is stored in the stack in accordance with the instruction of this data, and the stack pointer is set.

Next, table initialization data is read, and a series of operations of initializing the contents of an execution-time block management table and a shared resource management table is performed. Realization of such operations with the help of a high-order layer protocol implemented in a transport layer or higher of communication using an RS232C serial line, etc., and a network file system, which is commonly seen in the OS of the UNIX system, is not impossible. However, to perform remote memory access at a practical processing speed, implementation is necessary by using bus transactions of IEEE 1394.

As a result, when the application-layer programs 12-1 and 12-2 are to be created, these can be created without considering drawing in-charge areas, etc., and from an image point of view, a virtual connection seems to be established among virtual machines 500 themselves which are one step lower than the application-layer programs 12-1 and 12-2.

Next, distributed processing according to this embodiment in the case where a JAVA virtual machine is used as the virtual machine 500 is described in detail.

Figure 4:
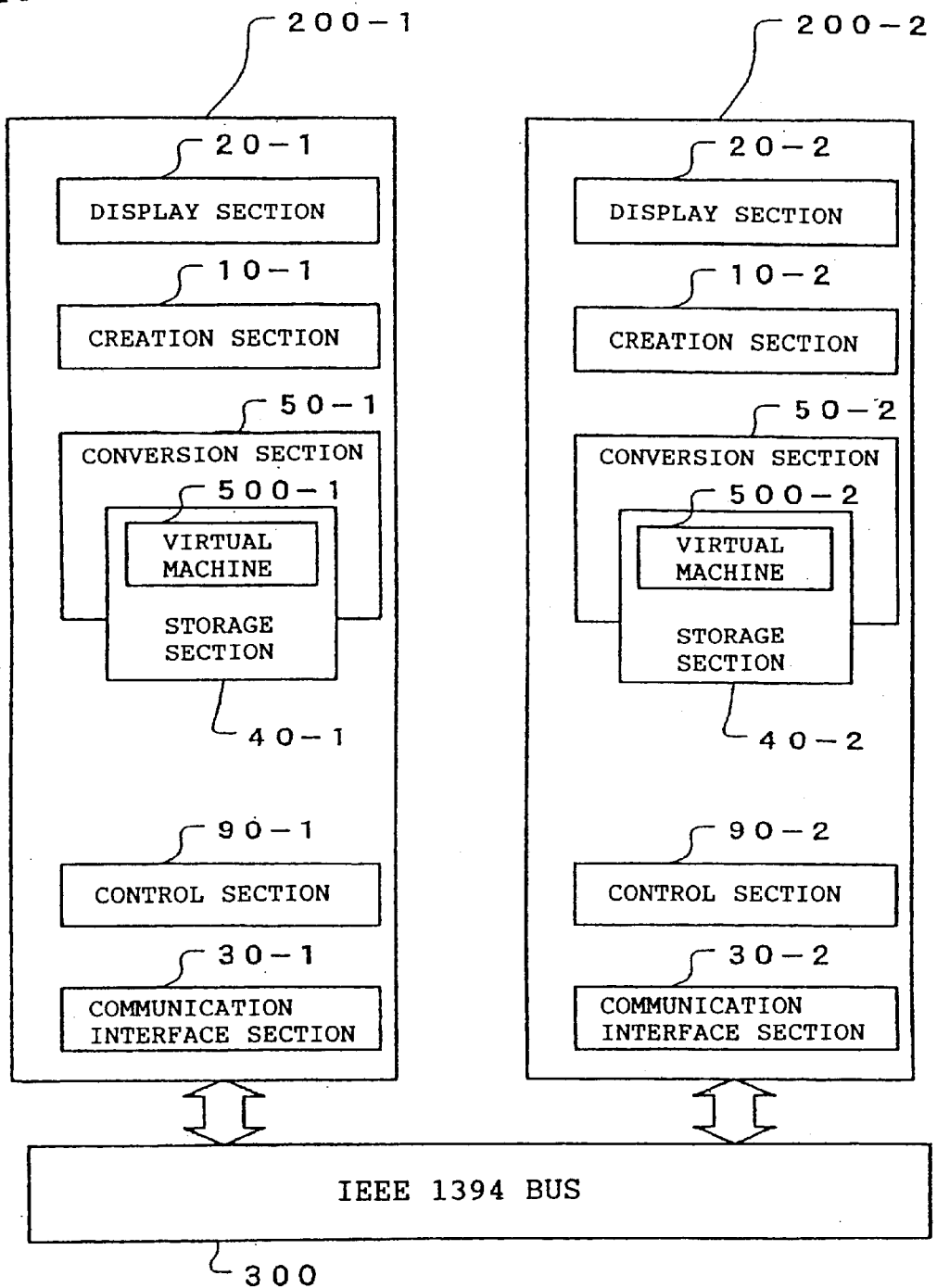
FIG. 4 is a function block diagram in a case where distributed processing according to this embodiment is performed.

FIG. 4 is a function block diagram in a case where distributed processing according to this embodiment is performed.

The liquid-crystal projector 200-1 includes a conversion section 50, in which the virtual machine 500 is provided, that converts supplied data, which is distributed from another liquid-crystal projector 200-2 which is a data distribution apparatus, into a creative or reproducible data format, and a communication interface section 30 that receives the supplied data from an input device 400, which can be converted by the conversion section 50.

The liquid-crystal projector 200 includes a creation section 10 that creates image data on the basis of the supplied data converted by the conversion section 50, a control section 90 that stores the created image data in a storage section 40 in such a manner so as to be managed for each of the other liquid-crystal projectors 200 and for each predetermined unit and that reads the image data for each of the other liquid-crystal projectors 200 and for each predetermined unit, and a playback section that plays back the read image data.

In the storage section 40, in addition to image data containing presentation data and supplied data distributed from another processing device, a management table, etc., used by the control section 90 is stored.

The storage section 40 can be accessed via the communication interface section 30 from another liquid-crystal projector 200, etc.

Next, the virtual machine 500 used in this embodiment is described.

Figure 5:
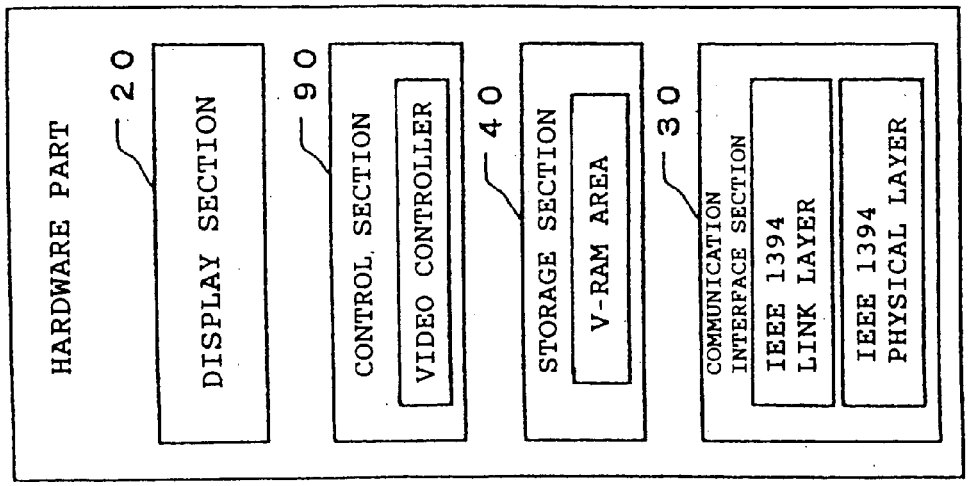
FIG. 5 is a function block diagram of a software part and a hardware part in a projector.
Figure 5:
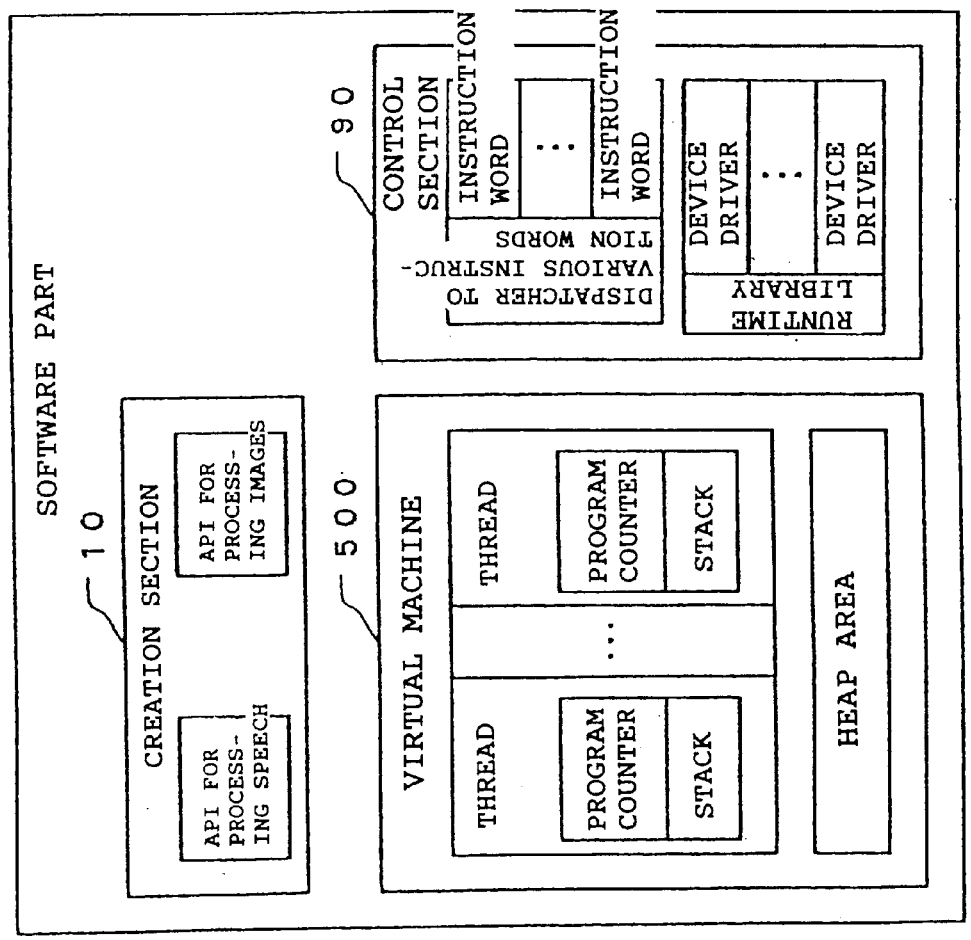

FIG. 5 is a function block diagram of a software part and a hardware part in the projector 200.

The software part includes a creation section 10 having an API (Application Programming Interface) for processing speech and an API for processing images, a control section 90 having plural instruction words, a dispatcher to instruction words, plural device drivers, and a runtime library, and a virtual machine 500.

In place of the API for processing speech and the API that processes images, a class that processes speech and a class that processes images may be implemented.

The "virtual machine 500" used in this embodiment is any device which reads a common file format and which is capable of performing operations specified thereby, and specifically, for example, a JAVA virtual machine, a virtual machine, in which an interpreter capable of performing parallel processing is implemented, disclosed in Japanese Unexamined Patent Application Publication No. 6-4498, etc., may be used.

As a method of implementing a JAVA virtual machine, an interpreter method and a compiler method, implemented in the software part, a dedicated CPU method implemented in the hardware part, etc., may be used, and in this embodiment, the method is implemented in the software part.

The virtual machine 500 includes a program counter, plural threads having one stack each, and a heap area. That is, the stack and the heap area are work areas and function also as the storage section 40.

Since there are plural threads, what is commonly called a "multi-thread process" is possible.

This makes it possible to improve execution performance during distributed processing and simultaneous executability.

The hardware part includes a playback section including a display section 20, a control section 90 having a video controller, a storage section 40 having a video RAM (V-RAM) area, and a communication interface section 30 having an IEEE 1394 link layer and an IEEE 1394 physical layer.

Next, an actual display process using plural liquid-crystal projectors 200-1 and 200-2 is described.

It is assumed that the liquid-crystal projector 200-1 functions as a master and that the liquid-crystal projector 200-2 functions as a slave.

It is assumed that the liquid-crystal projector 200-1 has drawn an image 1210-1, that is, from coordinate (0, 0) to coordinate (1024, 768). This drawing information is stored in the storage section 40.

When the second liquid-crystal projector 200-2 is connected to the IEEE 1394 bus 300, the liquid-crystal projector 200-1, which is a master, and the liquid-crystal projector 200-2, transmit and receive supplied data.

At this stage, the liquid-crystal projector 200-2 can determine that the liquid-crystal projector 200-1 has already been operating, and can confirm the drawing area which the liquid-crystal projector 200-1 is in charge of by referring to the drawing information of a storage section 40-1 of the liquid-crystal projector 200-1.

After this confirmation, the liquid-crystal projector 200-2 reads image information which should be displayed by the liquid-crystal projector 200-2 itself from the storage section 40-1 of the liquid-crystal projector 200-1, converts it by the virtual machine 500 into a data format in which processing is possible by the liquid-crystal projector 200-2 itself, writes it into the V-RAM area, and produces a display on the display section by using a video controller.

As described above, the stack areas inside the storage section 40 are present for each thread. Since the multi-thread process allows a stack area of another thread to be used even if a stack area of a particular thread is being used, simultaneous executability are not significantly decreased even when the storage section 40 is shared.

Also, since supplied data can be transmitted and received at high speed by using an IEEE 1394 bus 300 and an IEEE 1394 bus interface, even when the storage section 40 is shared, it is possible for each liquid-crystal projector 200 to refer to the storage section 40 of another liquid-crystal projector 200 at nearly the same rate as that when the storage section 40 of the liquid-crystal projector 200 itself is referred to.

Also, there are cases in which liquid-crystal projectors 200 having different display performances coexist, for example, a certain liquid-crystal projector 200 is a VGA display, i.e., a 640×480 pixel display, another liquid-crystal projector 200 is a SVGA display, i.e., a 800×600 pixel display, and still another liquid-crystal projector 200 is an XGA display, i.e., a 1024×768 pixel display.

In such a case, even when the above-mentioned coordinate (1500, 920) must be displayed, liquid-crystal projectors 200. having different display performances may be connected to each other so that that the coordinate appears on the display. For example, if the liquid-crystal projector 200, which is a master, is a VGA display, if a total of nine liquid-crystal projectors 200 are connected, a display area of 1920×1440 pixels can be handled, and the coordinate (1500, 920) may also appear in the display.

Even in such a case, it is possible to automatically adjust display performance by the liquid-crystal projector 200, which is a slave, by referring to the drawing. information inside the storage section 40 of the liquid-crystal projector 200 which is a master.

In the manner as described above, since image data can be created by efficient distributed processing, it is possible to create and play back even processing-intensive data and large volumes of data smoothly, and an image display system having high adaptability can be realized.

Although the methods which have thus been described are methods in which each liquid-crystal projector 200 displays images in an overlapping manner with respect to different display areas, it is also possible for each liquid-crystal projector 200 to display images in an overlapping manner with respect to the same display area.

As such a method of displaying images in an overlapping manner, for example, it is possible to use a display method in which there is a relationship of in front of and behind, such as foreground and background, a stereoscopic display method by superposing an image for the left eye and an image for the right eye, a three-dimensional display method using a varifocal mirror method, etc.

According to this, also when such a display method is realized, it is possible to produce a display quickly and appropriately by distributing loads.

Not only image display, but also an image creation process can be performed in a distributed manner. For example, image creation with heavy processing is performed by an image creation device having high processing performance, and image creation with light processing is performed by an image creation device having low processing performance, making it possible to distributed image processing loads.

In addition, as described above, simplification of hardware can be realized by performing resolution conversion by software rather than performing resolution conversion by hardware.

Next, simplification of hardware as a result of performing resolution conversion by software is described by using the drawings.

Figure 6:
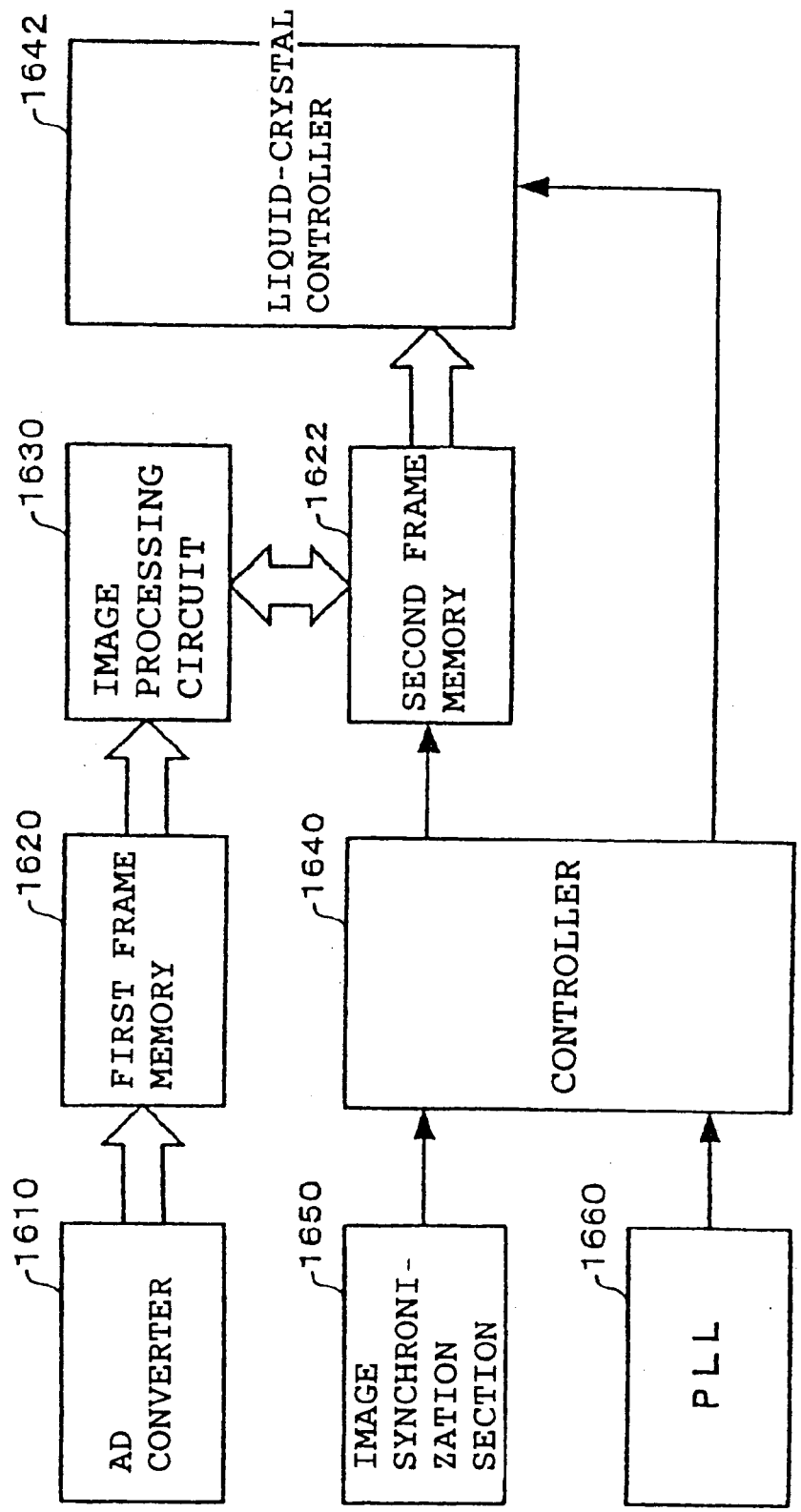
FIG. 6 is a function block diagram of an image processing part of an ordinary liquid-crystal projector.

FIG. 6 is a function block diagram of an image processing part of an ordinary liquid-crystal projector.

Generally, in a liquid-crystal projector, image data is converted into digital signals by an AD converter 1610, and image information is stored in a first frame memory 1620.

Thereafter, the image information is convoluted by an image processing circuit 1630 including a digital filtering circuit, and the resulting information is stored in a second frame memory 1622.

Then, in order that the image information be displayed in a liquid-crystal light valve using a liquid-crystal controller 1642, the image data within the second frame memory 1622 is read at a fixed periodicity.

Herein, the "convolution" is an image filtering technique and it attempts to change a tap coefficient according to the sharpness of an image in order to change the image quality.

Data transfer to the first frame memory 1620, etc., is performed by a controller 1640 to which an image synchronization signal is input from an image synchronization section 1650 and in which the clock is adjusted by a PLL 1660.

In these driving circuits, image deterioration due to a phase difference (shift) occurs due to differences in input image data, and in order to reduce this phase difference, a high-performance PLL circuit, etc., is necessary. Furthermore, in the case where it is assumed that plural liquid-crystal projectors having different resolutions are interconnected, a scaling circuit based on image processing for performing complementation of an image is necessary, and such image processing causes image degradation to occur.

On the other hand, as in this embodiment, if data conversion is performed on image data which is input to a liquid-crystal projector 200 according to the number of pixels by using application software for causing each section of the liquid-crystal projector 200 in which the virtual machine 500 is implemented to operate, image degradation as a result of image processing by a scaling circuit does not occur, and it is not necessary to provide plural frame memories, allowing circuit construction to be simplified.

Figure 7:
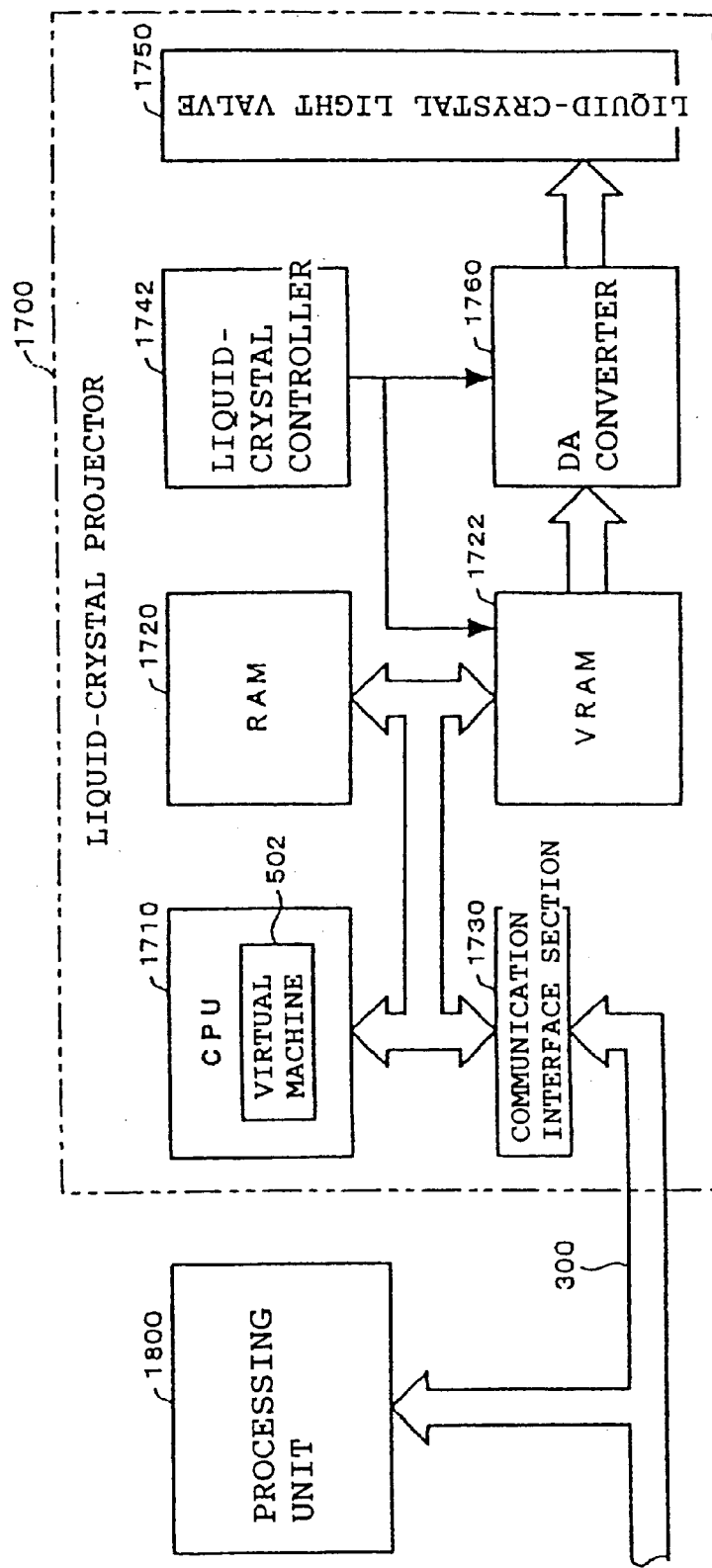
FIG. 7 is a function block diagram of an image processing part of a liquid-crystal projector according to this embodiment.

FIG. 7 is a function block diagram of an image processing part of a liquid-crystal projector 1700 according to this embodiment.

The liquid-crystal projector 1700 includes a communication interface section 1730, in which an IEEE 1394 bus-class driver, etc., is installed, that receives data from a processing unit 1800 via an IEEE 1394 bus 300, a CPU 1710 in which a virtual machine 502 is provided, a RAM 1720, a VRAM 1722, a liquid-crystal controller 1742, a DA converter 1760, and a liquid-crystal light valve 1750.

Supplied data containing the image data received by the communication interface section 1730 is translated by the virtual machine 502 inside the CPU 1710 and is temporarily stored in the RAM 1720 as image data.

In the virtual machine 502, functions for performing data conversion according to the number of liquid-crystal pixels are installed in advance, and at the time the image data is stored in the RAM 1720, the image data has already been converted into image data in accordance with the number of liquid-crystal pixels.

The converted image data is loaded as a display image into the VRAM 1722 by the liquid-crystal controller 1742, is converted into analog data by the DA converter 1760, and is displayed in the liquid-crystal light valve 1750.

The virtual machine 502 can be regarded as a set of instruction words that perform data conversion according to the number of pixels, and that perform data conversion according to the type of model, etc. That is, function expansion, etc., can be performed flexibly by software, as required.

As described above, since an image data conversion process can be performed by software, it is possible to simplify the hardware, such as frame memories.

In the foregoing, simplification of hardware and flexible function expansion are described by using FIGS. 6 and 7. As a technique for realizing such features, there is a technique in which data is distributed from a server apparatus and processing is performed thereon by an NC (Network Computer) of the client. The present invention is effective for such a technique. Next, an image display system including image display devices in the form of plural NCs and a server apparatus are described.

(Example of image display system including plural image display devices and server apparatus)

Figure 8:
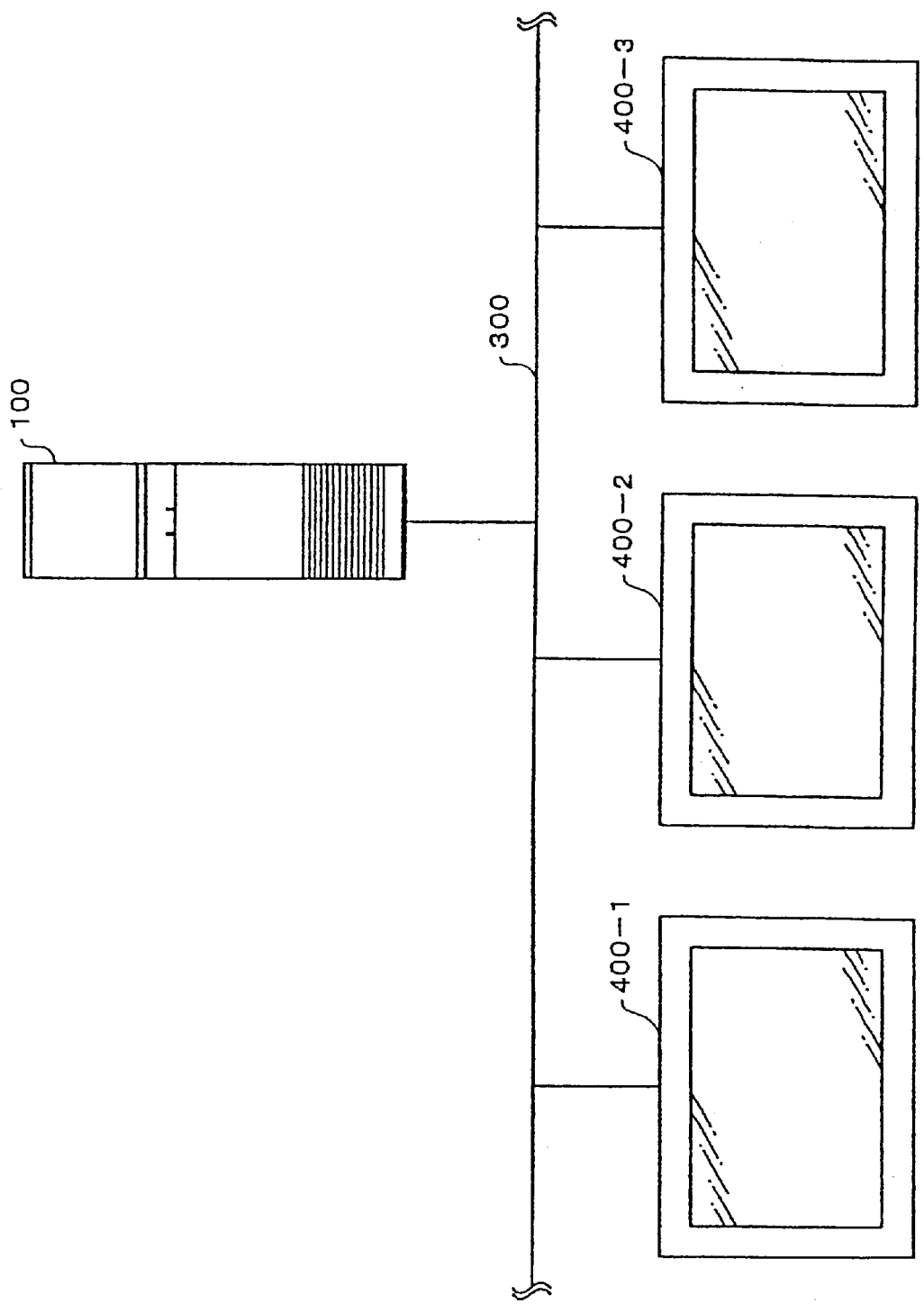
FIG. 8 is a schematic view of an image display system according to an example of this embodiment.

FIG. 8 is a schematic view of an image display system according to an example of this embodiment.

The image display system includes a server apparatus 100 that distributes created image data, etc., and plural image display terminals 400.

The image display terminal 400 can be a touch-panel-type multimedia information terminal that displays an automobile. Furthermore, each image display terminal 400 can display a different display area in a shared manner, such as an image display terminal 400-1 displaying the front of the automobile, an image display terminal 400-2 can display the right side of the automobile, and an image display terminal 400-3 can display a cross section of the automobile.

The image display terminal 400, whose liquid-crystal screen is a touch panel, receives supplied data, such as still images of an automobile, distributed from the server apparatus 100, displays it on the liquid-crystal screen, and transmits the operation information of the touch panel by a user to the server apparatus 100.

Even in such a general form, since updating of application software and data can be performed by the server apparatus 100, and the image display terminal 400 need only obtain data as required, this structure enhances hardware simplification and expandability.

However, adaptability is required in a case where, by instantly reflecting the operation information by the user, different image data is distributed to each image display terminal 400.

In this embodiment, as described above, the IEEE 1394 bus 300 is used for connection among processing devices in order to increase the data transmission and reception rate, and a storage area which can be accessed from each processing device is provided.

Generally, an image display system for performing such image display is applied to various sites. For example, the image display system can be used at large automobile fairs, automobile sale sites, and cases in which automobiles are designed.

In these various sites, various image display devices are used. As described above, if application software is developed according to a site in which it is used and an image display device to be used, a number of development steps and development costs are required.

In this embodiment, this problem is solved by using supplied data having a common file format and a virtual machine capable of performing appropriate data conversion by interpreting the file format.

Figure 9:
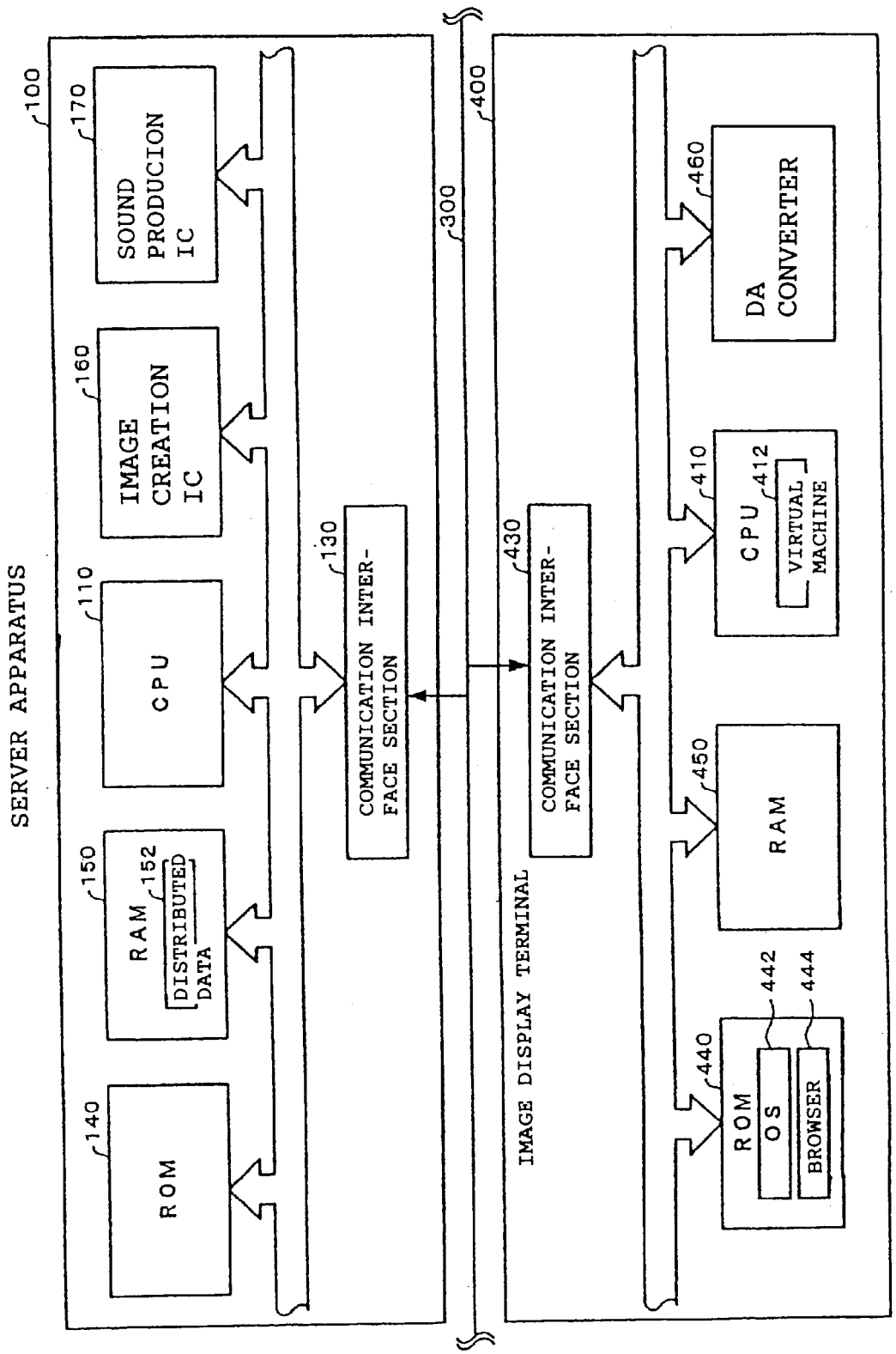
FIG. 9 is a function block diagram of an image display system according to an example of this embodiment.

FIG. 9 is a function block diagram of an image display system according to an example of this embodiment.

The server apparatus 100 includes a communication interface section 130 connected to the IEEE 1394 bus 300, a ROM 140, a RAM 150 that stores distributed data 152, a CPU 110, an image creation IC 160, and a sound production IC 170.

Image data, etc., is created by the CPU 110, the image creation IC 160, and the sound production IC 170, and the distributed data 152 converted by a conversion section (not shown) into a common file format, which can be converted by a virtual machine 412 and stored in the RAM 150.

The distributed data 152 stored in the RAM 150 is transmitted to the image display terminal 400 by the communication interface section 130.

The image display terminal 400 includes a communication interface section 430, a ROM 440 in which a browser 444 and an OS 442 are contained, a RAM 450, a CPU 410 in which the virtual machine 412 is implemented, and a DA converter 460.

The supplied data which is transmitted from the server apparatus 100 and which is received by the communication interface section 430 is subjected to data conversion by the virtual machine 412 and is stored in the RAM 450.

The image data contained in the supplied data stored in the RAM 450 is converted into analog data by the DA converter 460, and this data is shaped by software, such as the OS 442 and the browser 444, and is displayed on a display.

The communication interface sections 130 and 430 are similar to the above-described communication interface section 30.

On the other hand, the operation of the touch panel by the user is detected by a sensor section (not shown), is converted into operation information, and is temporarily stored in the RAM 450.

In a general processing method, in order for a client to update data inside a database of a server, an updating request is issued, and a data updating process is performed by the server.

On the other hand, in this method, the RAM 150 which is a storage area which can be accessed from another processing device and the IEEE 1394 bus 300 which enables high-speed access enable the image display terminal 400, which is a client, to directly update the data inside the RAM 150 of the server apparatus 100 by using the operation information.

More specifically, according to this method, since each image display terminal 400 can access the RAM 150, it is possible to realize an image display system having superior adaptability.

Furthermore, by using the virtual machine 412, it is possible to reduce development costs, etc., of application software, and dynamic function expansion of the image display device as a result of distribution of supplied data becomes possible.

In addition to a method for realizing distributed processing by a shared memory method which has thus been described, such distributed processing can also be performed by an object distribution method.

Furthermore, the above-described supplied data used in this embodiment is, what is called, data in which a data file and a process are integrally formed into a package and which can be converted by a virtual machine.

Specifically, the supplied data correspond to, for example, the original data of an image to be created, control data for controlling the creation of the image, image data, control data for controlling the display of the image, part objects which make up a part of a program for image processing, etc.

For example, if the communication interface section receives a part object as supplied data, the conversion section creates a program for creating the above-mentioned display data on the basis of the received part object.

According to this, the image display device receiving the part object is able to rapidly create the display data in which the part object is reflected.

More specifically, by distributing the part object, it is possible to realize an image display system capable of easily changing specifications, expanding functions, etc.

Furthermore, if the communication interface section receives, as supplied data, image data and data for image display control, it is possible to realize an image display system capable of exchanging various data among processing units. For example, processes become possible, such as underlining some characters to be displayed or creating an image such that some of the images to be displayed are highlighted, by using data for image display control.

As a technique for creating such supplied data which can be converted by a virtual machine, for example, a technique for performing compiling by a compiler for a virtual machine can be used.

In the foregoing, a technique for realizing an image display system has been described. It is also possible to realize an image display system which exhibits the above-described operational effects by using a computer-readable information storage medium.

(Explanation of information storage medium)

Figure 11:
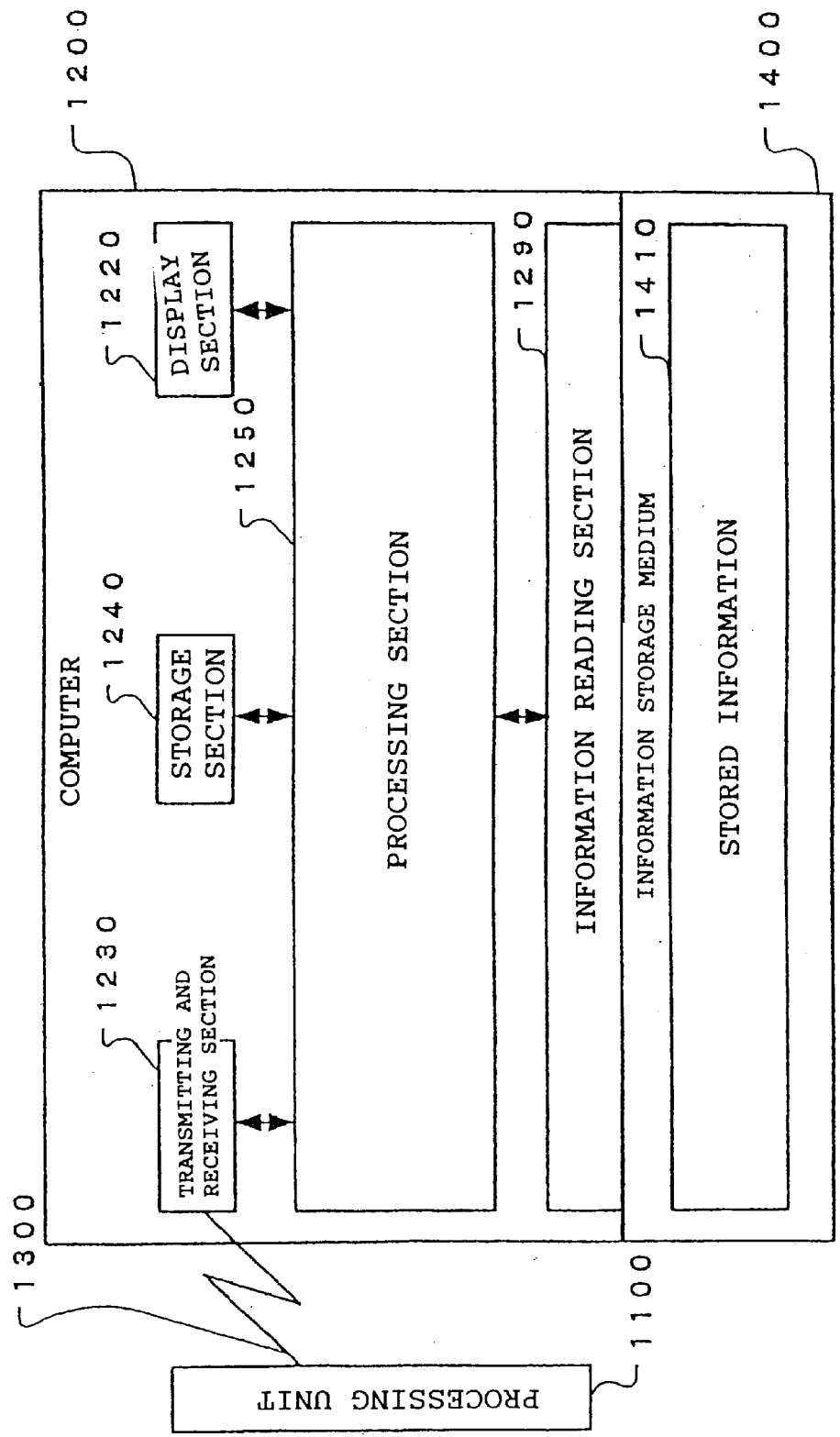
FIG. 11 is a function block diagram of an information storage medium according to an example of this embodiment.

FIG. 11 is a function block diagram of an information storage medium 1400 according to an example of this embodiment.

The information storage medium 1400 has stored information for realizing the above-described various functions in stored information 1410 to be read by a computer 1200.

The computer 1200 includes a transmitting and receiving section 1230 that performs communication with another processing device 1100 via a communication line 1300, a storage section 1240 that stores various data, programs, etc., a processing section 1250 that performs image processing, etc., a display section 1220 that performs data reproduction, such as for image display, and an information reading section 1290 that reads information from the information storage medium 1400.

Exemplary hardware for each of these sections is provided below. For example, as the transmission and receiving section 1230, a communication device having an IEEE 1394 interface, an ATM switch, etc., may be used; as a storage section 1240, a ROM, a RAM, etc., may be used; as the display section 1220, a display, a monitor, a projection device, etc., may be used; and as the processing section 1250, a CPU, an image processor, etc., may be used.

Furthermore, as the information storage medium 1400, for example, a CD-ROM, a DVD-ROM, etc., from which information is read by laser light, a hard disk from which information is read magnetically, a memory, etc., may be used.

Rather than directly connecting the information storage medium 1400 to the information reading section 1290, it is also possible to cause the computer 1200 to download and read the stored information 1410 in the server apparatus via the communication line 1300.

Furthermore, as the communication line 1300 which is a transmission line, for example, an IEEE 1394 bus, optical fibers, etc., may be used.

In order to realize the above-described functions, for example, the stored information 1410 is formed as information for creating and displaying images while performing distributed processing by transmitting and receiving supplied data in a common format which can be interpreted by the virtual machine 500 among plural processing devices 1100 which are connected via the communication line 1300 which is a transmission line.

Specifically, the stored information 1410 is formed to contain information for implementing a communication interface section for sharing the storage section 1240 with another processing device 1100.

According to this, it is possible to provide the storage section 1240 which can be accessed from each processing device 1100. As a result of realizing such a storing method, simultaneous executability is improved, which is effective, in particular, in distributed processing.

Furthermore, by using the virtual machine 500 and by standardizing supplied data to a common format, it is possible for each processing device 1100 and the computer 1200 to communicate with each other without needing to know the communicating party, which is effective, in particular, in distributed processing.

Herein, preferably, the transmission line is an IEEE 1394 bus, and the communication interface section is an IEEE 1394 bus interface.

According to this, each processing device 1100 can access, at high speed, the storage section 1240 which is shared, as if access to a storage area of the device itself were being made.

As another structure of the stored information 1410, the stored information 1410 can be formed to contain information for creating supplied data in a common format, and information for transmitting the created supplied data to at least one processing device 1100 having a storage section which can be accessed by each processing device 1100.

According to this, by creating supplied data in a common format and by storing it in a storage section in a shared form, it is possible for each processing device 1100 to access the storage section and to obtain the supplied data, which is effective, in particular, in distributed processing.

For example, in the case where JAVA applets are used as supplied data, it is possible for plural processing devices to download JAVA applets stored in the storage section at the same time, and it is possible to easily change specifications and expand functions.

Furthermore, as another structure of the stored information 1410, with respect to at least one processing device 1100 having a storage section which can be accessed by each processing device 1100 and in which image data is stored, the stored information 1410 can be formed to contain reading information for reading the image data stored in the storage section, and information for display purpose for displaying the read image data.

Herein, the information for reading purpose contains information for creating supplied data indicating a reading request and for converting it into supplied data in the common format, and information for transmitting the converted supplied data to the processing device 1100 having the storage medium and for receiving supplied data containing image data from the processing device 1100.

Furthermore, the information for display purpose contains information for implementing the virtual machine 500, and information for converting supplied data by using the virtual machine 500 and displaying an image, on the basis of the received supplied data.

According to this, as a result of using supplied data in a common format, it is possible to receive and display image data without depending on the type of apparatus on an image providing side by overcoming differences in their operating systems and their makers.

Furthermore, as another structure of the stored information 1410, the stored information 1410 is formed to contain information for request purpose for requesting a predetermined service to another processing device 1100, and provision information for providing a predetermined service to another processing device 1100.

Herein, the request information contains information for creating supplied data indicating a request for the predetermined service and converting it into supplied data in the common format, and information for transmitting the converted supplied data to another processing device.

Furthermore, the provision information contains information for implementing the virtual machine 500, information for receiving supplied data indicating a service request from another processing device 1100 and converting it by using the virtual machine 500, information for determining whether or not the service can be provided on the basis of the converted supplied data, and information for providing the service when the service can be provided.

According to this, it is possible for each processing device 1100 and the computer 1200 to perform image processing in a shared manner while exchanging information. For example, if a printing service is requested from the projector, a printer capable of providing a printing service responds to this and performs printing.

Such distributed processing can also be realized by using the virtual machine 500 and by forming supplied data into a common format so as to make it easy to exchange data between each processing device 1100 and the computer 1200.

Furthermore, preferably, the supplied data contains at least one of image data, an object for image creation, an object for image creation control, an object for image display, and an object for image display control.

According to this, since these data and objects are standardized in a common format, it is possible to increase the versatility of various types of image processing in distributed processing.

(Modification)

The present invention is not limited to the above-described embodiments, and various modifications are possible.

For example, although an example is described in which the above-described transmission line uses the IEEE 1394 bus 300, various transmission lines can be used as long as they are high-speed transmission lines. Specifically, for example, fiber channels, satellite communication lines, etc., can be used.

Furthermore, the image display system is not limited to one using a liquid-crystal projector, and the present invention can be applied to various types of image display systems, such as stereoscopic display systems using a display, a monitor, a varifocal mirror method, etc.

Figure 10:
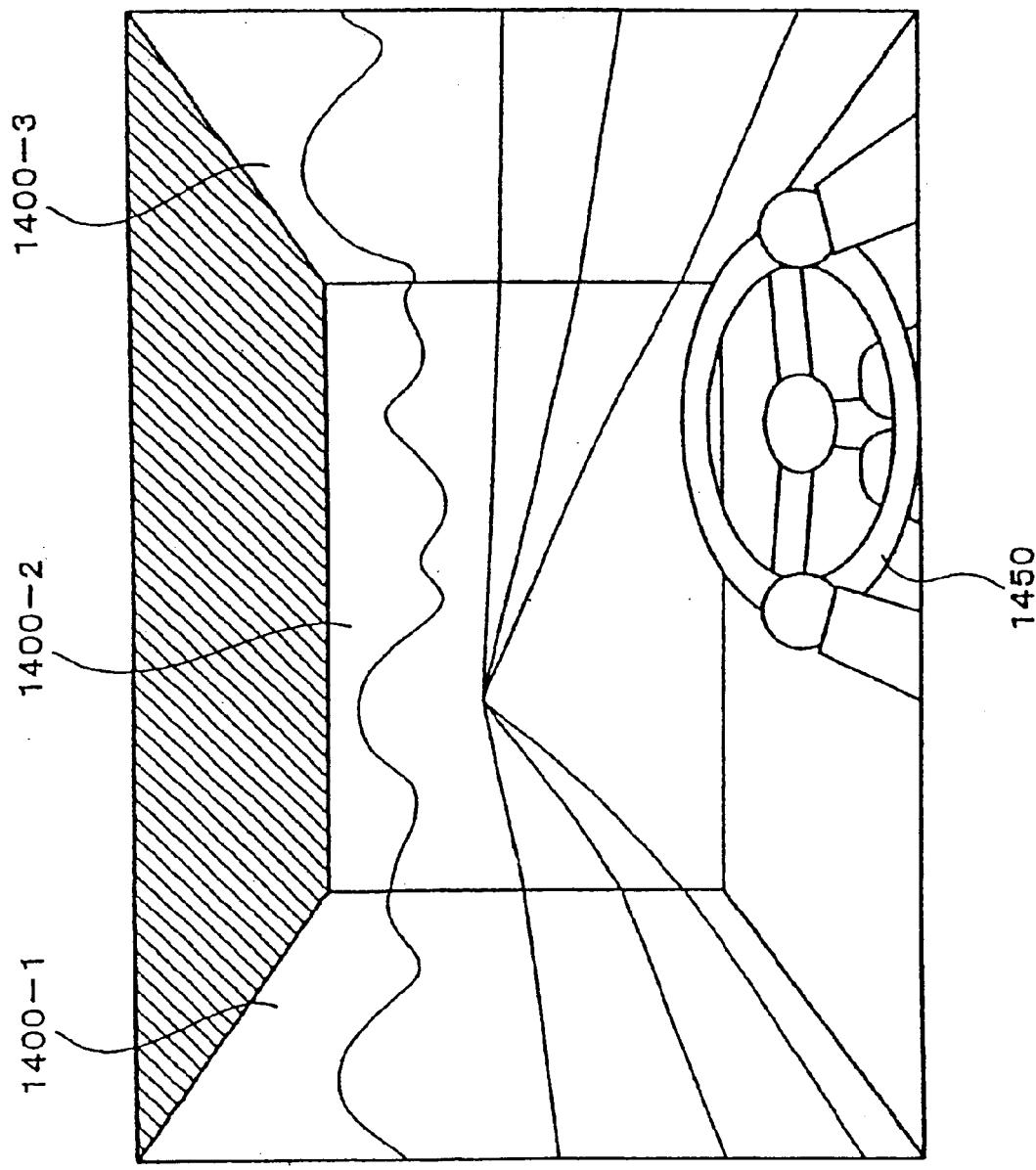
FIG. 10 is a schematic view of an image display system according to another example of this embodiment.

FIG. 10 is a schematic view of an image display system according to another example embodiment.

For example, the present invention can be applied to an image display system in which continuous images are displayed by three displays 1400-1 to 1400-3 such as those shown in FIG. 10 in order to perform simulation of operation (driving).

By applying the present invention to such a simulator, it is possible to realize an image display system capable of instantly reflecting the operation information of a handle or steering wheel 1450 by the operator and capable of performing image processing at high speed even when landscape images which are continuous over the three image screens are displayed in real time.

Furthermore, as image display devices, in addition to projectors, for example, display devices, such as CRTs (Cathode Ray Tube), PDPs (Plasma Display Panel), FEDs (Field Emission Display), ELs (Electroluminescent Display), and direct-view-type liquid-crystal display devices, may be used.

Furthermore, as projectors, in addition to liquid-crystal projectors, for example, CRT projectors, projectors using DMD (Digital Micromirror Device) devices, etc., may be used.

In addition, as described above, a programming language for realizing the present invention is not limited to JAVA. There are a number of languages which can create a machine language for a virtual machine and which can support processes for multiplexing uses of processor resources at the stage (level) of the machine language. In such a language, descriptions similar to those of the above-described drawing commands in the present invention can be made. The present invention can be realized by using various types of languages without depending on the construction of sentences of a high-level language level used until drawing instruction words are created and on the specifications of parsing of words and phrases.

Industrial Applicability

The present invention can be used in an image display system and an information storage medium for displaying images.

What is claimed is:

1. An image display system which transmits and receives supplied data which can be converted by a virtual machine, comprising:

a transmission line; and a plurality of processing devices connected via the transmission line, an image being created and displayed among the plurality of processing devices, at least two processing devices of the plurality of processing devices each including an image display device, at least one of the image display devices including:

a converter, in which the virtual machine is provided, that converts said supplied data into a data format in which an image can be displayed, the virtual machine including a plurality of threads and stack areas to perform parallel processing;

a communication interface section that receives said supplied data from another processing device; and a storage medium in which created images are stored and which can be accessed from another processing device via said communication interface section, each of said at least one of the image display devices and another image display device reading some respective portion of said created images from said storage medium and displaying the read respective portion of said created images in a shared manner for a real-time unified image display, the another image display device including said converter and said communication interface section, thereby achieving the real-time unified image display from a distributed processing environment processing different distributed image data.

2. An image display system which transmits and receives supplied data which can be converted by a virtual machine, comprising:

a transmission line; and a plurality of processing devices connected via the transmission line, an image being created and displayed among the plurality of processing devices, at least two processing devices of the plurality of processing devices each including an image creation device, at least one of the image creation devices including:

a converter, in which the virtual machine is provided, that converts said supplied data into a data format in which an image can be created, the virtual machine including a plurality of threads and stack areas to perform parallel processing;

a communication interface section that receives said supplied data from another processing device; and a storage medium in which created images are stored and which can be accessed from another processing device via said communication interface section, each of said at least one image creation device and another image creation device accessing said storage medium, reading a respective portion of said created images, and displaying the respective portion of said created images in a shared manner for a real-time unified image display, the another image creation device including said converter and said communication interface section, thereby achieving the real-time unified image display from a distributed processing environment processing different distributed image data.

3. An image display system which transmits and receives supplied data which can be converted by a virtual machine, comprising:

a transmission line; and a plurality of processing devices connected via the transmission line, an image being created and displayed among the plurality of processing devices, at least one processing device of the plurality of processing devices including an image creation device, at least one processing device of the plurality of processing devices including an image display device, said image display device including:

a converter, in which the virtual machine is provided, that converts said supplied data into a data format in which an image can be displayed, the virtual machine including a plurality of threads and stack areas to perform parallel processing; and a communication interface section that receives said supplied data from another processing device, said image creation device including:

a supplied data creation device that creates supplied data which can be converted by said converter on the basis of the created image; and a communication interface section that transmits supplied data containing the created image to said image display device via said transmission line, at least one of said image creation device and said image display device including a storage medium in which created images are stored and which can be accessed from another processing device via said communication interface section for a real-time unified image display, and each of said image creation device and said image display device accessing said storage medium, obtaining data as required and creating and displaying a respective portion of said created images, thereby achieving the real-time unified image display from a distributed processing environment processing different distributed image data.

4. The image display system according to claim 1, said supplied data containing a part object which makes up a part of a program for image processing, and said converter creating a program for creating said display data on the basis of said received part object.

5. The image display system according to claim 1, said supplied data containing at least one of image data and control data for controlling a display of said image, and said image display device including:

a display device that displays said image on the basis of said image data; and a controller that controls a display of said image on the basis of said control data.

6. The image display system according to claim 2, said supplied data containing at least one of the original data of an image to be created and control data for controlling a creation of said image, and said image creation device including:

an image creating device that creates said image on the basis of said original data; and a controller that controls the creation of said image on the basis of said control data.

7. The image display system according to claim 1, said transmission line being an EEE 1394 bus, and said communication interface section being an EEE 1394 bus interface.

8. The image display system according to claim 1, said plural image display devices being interconnected via said transmission line, and each image display device displaying a different display area in a shared manner.

9. The image display system according to claim 1, said plural image display devices being interconnected via said transmission line, and each image display device displaying images in an overlapping manner with respect to the same display area.

10. The image display system according to claim 4, at least one of said image creation device and said image display device including a projector.

11. An information storage medium for an image display system comprising a plurality of processing devices connected via a transmission line, the information storage medium storing information for creating and displaying portions of an image while distributed processing is being performed by transmitting and receiving supplied data in a common format which can be interpreted by a virtual machine among the plurality of processing devices connected via a transmission line, and which can be read by a computer having a storage medium, the virtual machine including a plurality of threads and stack areas to perform parallel processing, said information containing information for implementing a communication interface section to share said storage medium with another processing device to obtain data as required, for a real-time unified image display of the portions of an image, thereby achieving the real-time unified image display from a distributed processing environment processing different distributed information.

12. An information storage medium for an image display system comprising a plurality of processing devices connected via a transmission line, the information storage medium storing information for creating and displaying portions of an image while distributed processing is being performed by transmitting and receiving supplied data in a common format which can be interpreted by a virtual machine among the plurality of processing devices connected via a transmission line, and which can be read by a computer, the virtual machine including a plurality of threads and stack areas to perform parallel processing, said information containing information for creating supplied data in said common format, and information for transmitting said created supplied data to at least one of said processing devices having a storage medium which can be accessed by each processing device to obtain data as required for a real-time unified image display of the portions of an image, thereby achieving the real-time unified image display from a distributed processing environment processing different distributed information.

13. An information storage medium for an image display system comprising a plurality of processing devices connected via a transmission line, the information storage medium storing information for creating and displaying portions of an image while distributed processing is being performed by transmitting and receiving supplied data in a common format which can be interpreted by a virtual machine among the plurality of processing devices connected via a transmission line, and which can be read by a computer, the virtual machine including a plurality of threads and stack areas to perform parallel processing, said information including:

reading information for reading image data stored in said storage medium, at least one of said processing devices having the storage medium which can be accessed by each processing device to obtain data as required and in which the image data is stored for a real-time unified image display of the portions of an image; and display information for displaying the read image data, said reading information including:

information for creating supplied data indicating a reading request and for converting the supplied data into supplied data in said common format; and information for transmitting the converted supplied data to a processing device having a storage medium and for receiving supplied data containing image data from the processing device, and said display information including:

information for implementing said virtual machine; and information for converting supplied data by using said virtual machine on the basis of received supplied data and for displaying an image, thereby achieving the real-time unified image display from a distributed processing environment processing different distributed information.

14. An information storage medium for an image display system comprising a plurality of processing devices connected via a transmission line, the information storage medium storing information for creating and displaying portions of an image while distributed processing is being performed by transmitting and receiving supplied data in a common format which can be interpreted by a virtual machine among the plurality of processing devices connected via a transmission line, and which can be read by a computer, the virtual machine including a plurality of threads and stack areas to perform parallel processing, said information including:

request information for requesting a predetermined service to another processing device to obtain data as required; and provision information for providing a predetermined service to another processing device, said request information including:

information for creating supplied data indicating a request for said predetermined service and for converting the supplied data into supplied data in said common format; and information for transmitting the converted supplied data to another processing device for a real-time unified image display of the portions of an image, and said provision information including:

information for implementing said virtual machine;

information for receiving supplied data indicating a service request from another processing device and for converting the supplied data by using said virtual machine;

information for determining whether or not the service can be provided on the basis of the converted supplied data; and information for providing the service when the service can be provided, thereby achieving the real-time unified image display from a distributed processing environment processing different distributed information.

15. The information storage medium according to claim 11, said supplied data including at least one of image data, an object for creating an image, an object for controlling image creation, an object for displaying an image, and an object for controlling image display.

16. An information storage medium according to claim 11, said transmission line including an EEEE 1394 bus.

* * * * *